Dec. 28, 1926.

J. B. HENDERSON 1,612,434

CONTROLLING THE STEERING OF DIRIGIBLE CRAFT

Original Filed May 12, 1922    4 Sheets-Sheet 1

INVENTOR.
JAMES B. HENDERSON
by
HIS ATTORNEYS

Dec. 28, 1926.
J. B. HENDERSON
1,612,434
CONTROLLING THE STEERING OF DIRIGIBLE CRAFT
Original Filed May 12, 1922    4 Sheets-Sheet 2
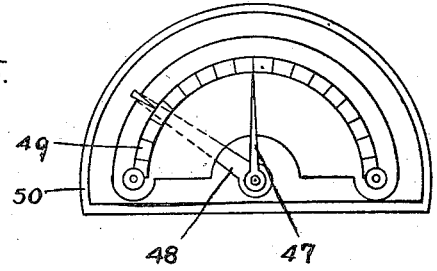
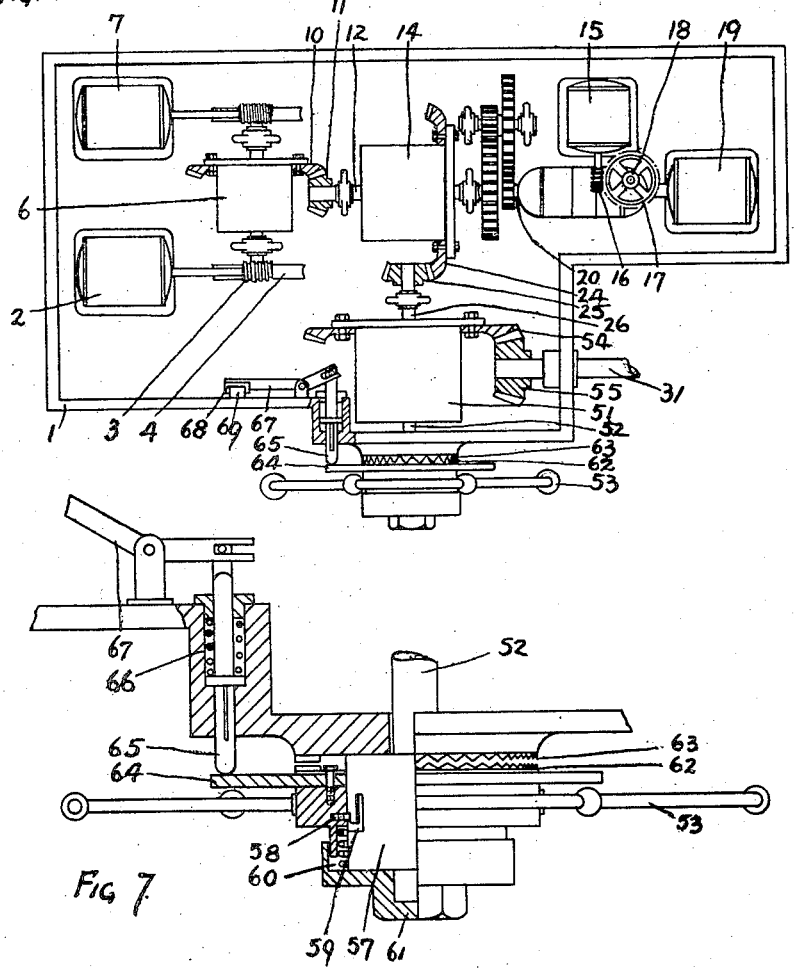
INVENTOR:
JAMES B. HENDERSON.
by
Moakley and Gill
HIS ATTORNEYS Dec. 28, 1926.

J. B. HENDERSON 1,612,434

CONTROLLING THE STEERING OF DIRIGIBLE CRAFT

Original Filed May 12, 1922    4 Sheets-Sheet 3

INVENTOR:
JAMES B. HENDERSON
by
Mahley and Gill
HIS ATTORNEYS.

Dec. 28, 1926.　　　　　　　　　　　　　　1,612,434
J. B. HENDERSON
CONTROLLING THE STEERING OF DIRIGIBLE CRAFT
Original Filed May 12, 1922　　4 Sheets-Sheet 4

INVENTOR:
JAMES B. HENDERSON.
by
Moakley and Gill
HIS ATTORNEYS.

Patented Dec. 28, 1926.

1,612,434

UNITED STATES PATENT OFFICE.

JAMES BLACKLOCK HENDERSON, OF BLACKHEATH, ENGLAND.

CONTROLLING THE STEERING OF DIRIGIBLE CRAFT.

Application filed May 12, 1922, Serial No. 560,491, and in Great Britain May 13, 1921. Renewed May 1, 1926.

In my prior applications Serial Nos. 433,731, 171,319 and 313,530 I have described gyroscopic mechanisms for automatically controlling the rudder of a ship or aeroplane by means of a combination of displacement and velocity control either through a mechanical relay or a hand "follow-the-pointer" mechanism, whereby the ship or aeroplane is caused to move in a damped oscillation about a certain straight course. The particular straight course can be altered at will and is maintained as set, provided there is no permanent external couple tending to deflect the craft from the set course. If such a couple exists the course followed is inclined to the set course at an angle which varies with the magnitude of the external couple.

My present invention consists in improvements in the gyroscopic control mechanism to counteract any steady or slowly varying external couple tending to deflect the ship or aeroplane from the prescribed course.

Suppose that the datum of displacement control is a free gyroscope or a gyro compass and that the velocity control is applied by a constrained gyroscope as described in my previous applications, then according to my former inventions the control mechanism imparts two displacements to the tiller, one proportional to the displacement from the prescribed course and the other proportional to the angular velocity of the ship, so that the angular motion is represented by the equation $$\ddot{\theta} + a\dot{\theta} + b\theta = 0$$

where $a$ and $b$ represent the constants of the velocity ($\dot{\theta}$) and displacement ($\theta$) controls respectively, $\ddot{\theta}$ being the acceleration. The term $a\dot{\theta}$ represents what is called "check helm" when applied by a steersman.

The above formula contains no factor representing "weather helm" and if an external couple exists say due to wind which requires a constant helm to balance its effect, in default of this component in the steering control the ship will fall off from its set course until the displacement is sufficient to provide an amount of helm which will be equal to the amount of weather helm required to maintain a straight course. The straight course attained however, will not be the desired course. My present invention not only compensates for this deviation by supplying the weather helm component, deficient in my previous inventions, but also automatically varies the amount of such compensation with any slow variations in the external couple, so that the ship is kept closely upon her prescribed course.

This compensation is made by applying an additional displacement control to the tiller, depending upon the time integral of the deviation from the prescribed course and being preferably proportional thereto, so that if the ship, with the displacement and velocity controls in action, deviates steadily from her prescribed course, the action of this additional displacement control is to move the tiller very slowly over in the compensating direction by an amount proportional to the time integral of the deviation. This additional movement of the rudder will bring the ship slowly back to the prescribed course, the zero position of the rudder being then not amidship but displaced by the amount of the time integral component, which is maintained. The equation of motion then becomes $$\ddot{\theta} + a\dot{\theta} + b\theta + c\int \theta dt = 0$$

in which the weather helm component is represented by the term $$c\int \theta dt$$

Although I prefer to employ an integrator which correctly integrates the deviation, it will be evident that any mechanism which will displace the rudder very slowly until the deviation is corrected would satisfy the requirements. Such a mechanism is of course an integrator, but it integrates, not the deviation of the craft, but the slow velocity of displacement of the rudder.

My invention therefore consists broadly in applying to the tiller of a ship or aircraft displacements to eliminate the displacements from a prescribed course brought about (1) by periodic or casual external forces and (2) by external forces of constant direction which are continuous or which fluctuate with long period.

In carrying out my invention according to one modification I preferably employ a gyro compass as the datum of direction to give both the displacement and the time integral controls and I may employ a constrained gyroscope to give the velocity control.

I may, however employ a gyro compass to give all three controls which vary with the deviation or with the change of deviation of the ship from her prescribed course, thus eliminating the constrained gyroscope.

I may also control the steering by a constrained gyroscope, deriving therefrom a single displacement of the tiller comprising the three factors of displacement, velocity and time integral of the displacement.

Although in the following description for the sake of brevity I deal only with the steering of ships, unless otherwise stated, it is to be understood that the invention has reference to the steering of all kinds of ships, submarines, torpedoes, aeroplanes, airships or other such dirigible bodies and is applicable to the control of steering in both the vertical and horizontal planes, and against the action of any external couples, including gravity. In controlling steering in the vertical plane I employ a vertical gyro pendulum instead of a gyro compass as the datum of reference, in conjunction with a following mechanism to actuate the relays just as in the case of a gyro compass controlling a vertical rudder for steering in the horizontal plane. Similarly for steering in the vertical plane, to obtain the velocity control from a constrained gyroscope it is only necessary in the following description to imagine the constrained gyroscope illustrated to be attached to the frame by vertical trunnions.

In the accompanying drawings I show several of the many ways of putting my invention into effect.

Figs. 1 and 6 are two alternative lay-outs of a preferred method, including means of making automatic and manual steering immediately interchangeable, and a means of effecting the time integral control.

Figure 1:
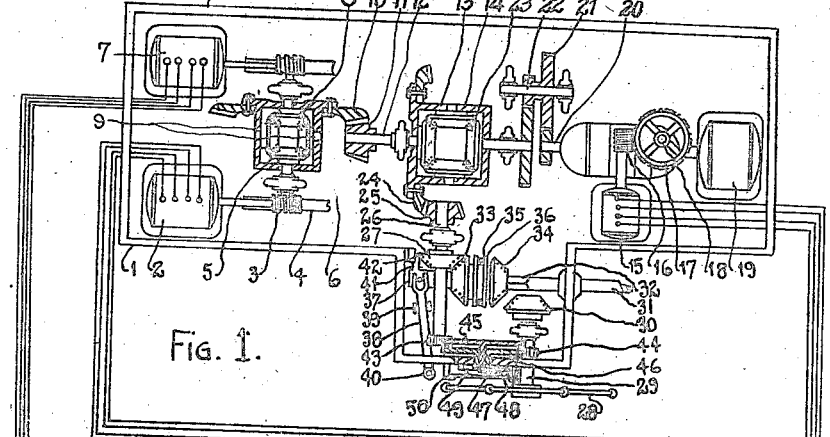
Figure 2:
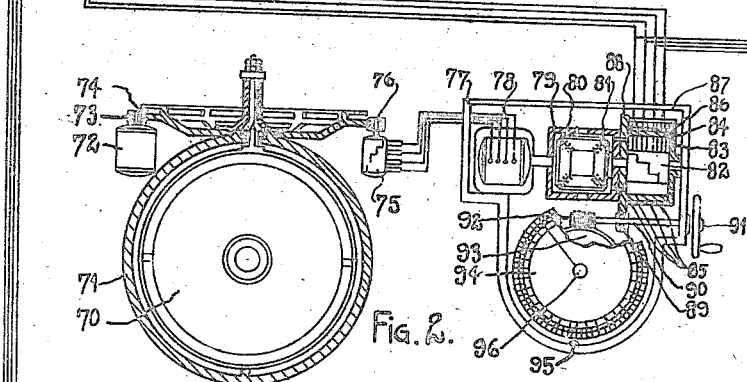
Fig. 2 illustrates my preferred method of deriving the displacement and time integral controls from a gyro compass, and also a positive directional control or means of setting and altering course without resorting to manual steering, and without risk of disturbing the compass through handling.
Figures 3, 4:
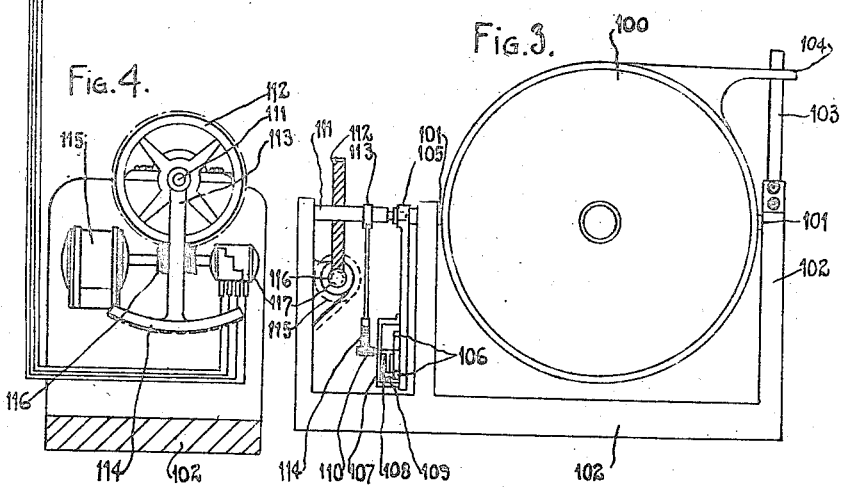
Figs. 3 and 4 show a method of obtaining the velocity control from a constrained gyroscope, Fig. 4 being an end elevation of part of Fig. 3.

The electrical connections between the various parts of Figs. 1, 2 and 4 are shown in diagrammatic form.

Fig. 5 is an enlarged elevation of part of Fig. 1 a helm indicator for both manual and automatic steering.

Fig. 7 is an enlarged plan of the manual steering wheel of Fig. 6, showing the clutch mechanism.

Figure 8:
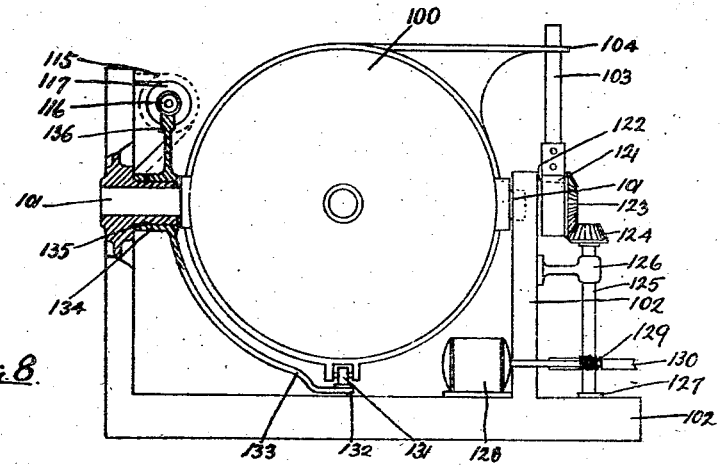

Fig. 8 illustrates a method of obtaining a combined displacement and velocity control from a constrained gyroscope which gives a more positive directional control than the methods described in my previous patents.

Figure 9:
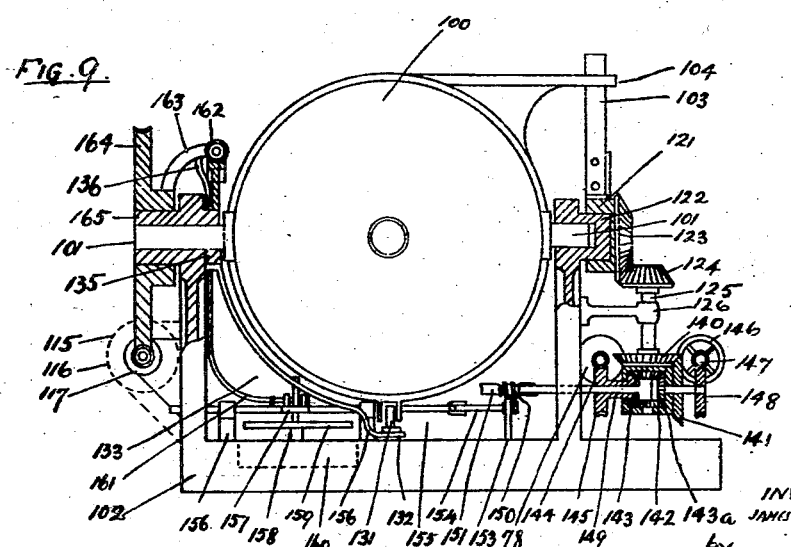

Fig. 9 illustrates a method of obtaining from a constrained gyroscope a single control combining all three factors of displacement, angular velocity, and time integral of displacement.

Figure 10:
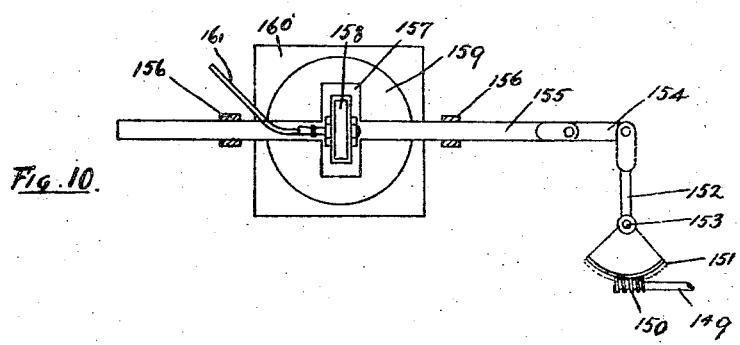

Fig. 10 is a plan of the integrator of the friction disc type shown in elevation in Fig. 9.

Figure 11:
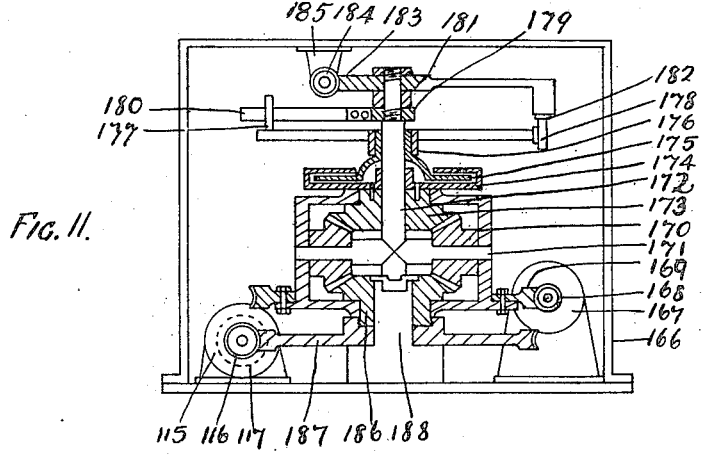

Fig. 11 shows a means of obtaining a combined three component control from a gyro compass only, including means of setting and altering course.

In Fig. 1, 1 is a box shown with the cover removed in which is contained all the mechanism required for imposing on the ship's telemotor shaft all the displacements, automatic or manual, required for steering a straight set course, 2 is a step-by-step motor which receives from a course-setting mechanism and from a gyro compass (by means which will be described later) displacements (a) proportional to any desired change of prescribed course and (b) proportional to any movement of the ship in azimuth, the proportion in each case being the same. Its net displacement is therefore set course minus ship's heading, i. e. the ship's deviation, if any, from the set course. This displacement of the armature of the motor 2 is communicated by the worm 3 and worm wheel 4 to the pinion 5 of a differential gear 6. Motor 7 is a second step-by-step motor similar to 2 receiving from a constrained gyroscope (as will be seen later) a displacement proportional to the angular velocity, if any, of the ship. This displacement is communicated in the same way as that of the motor 2 to the opposite pinion 8 of the differential gear 6.

These two displacements of the pinions 5 and 8 are combined through the planet pinions 9 and casing of the differential gear 6 and communicated through the bevel gears 10 and 11 to the shaft 12 which carries at its other end a pinion 13 of the differential gear 14. The pinion 13 therefore receives two displacements, one proportional to the deviation and the other proportional to the angular velocity. 15 is a third step-by-step motor receiving the same displacement as motor 2 and from the same transmitter. This displacement, which is proportional to the ship's deviation from the set course, is conveyed through the worm 16 to the worm wheel 17 which is keyed to the actuating spindle 18 of a Williams-Janney swash-plate variable speed gear (or any other suitable type of variable speed gear) the driving shaft of which is rotated at constant speed by a D. C. motor 19. The driven shaft 20 of the variable speed gear is connected by double reduction gears 21 and 22 to a shaft driving the other pinion 23 of the differential gear 14. When the ship is on her course the motor 15 is at its zero position and the actuating spindle 18 of the variable speed gear is at its no-motion position, but on the ship deviating from its course the motor 15 will rotate the spindle 18 in one direction or the other, according as the deviation is to port or to starboard, and by an amount proportional to the deviation, thus causing motion of the shaft 20 and pinion 23, the velocity of which will be proportional to the magnitude of the deviation but will have constant direction and will continue as long as the deviation lasts. Hence the rotation of the pinion 23 will be proportional to the time integral of the deviation. Even for large deviations the movement of pinion 23 will be very slow so that for deviations of short duration the effect will be negligible.

We have seen, then, that the pinion 13 has two displacements proportional respectively to the ship's deviation and the angular velocity, while the pinion 23 has a displacement proportional to the time integral of the deviation. These displacements are combined by the differential gear 14 and communicated by bevel gears 24 and 25 to the shaft 26 to which is keyed a bevel pinion 27. The movement of the pinion 27 is therefore proportional to the sum of all three components, deviation, angular velocity and time integral of the deviation, and having decided on the values which I wish to give to the three constants, $a$, $b$ and $c$ I arrange the steps of the motors and the various gear ratios in the mechanism of Fig. 1 to give a movement of the pinion 27 consonant with the formula, $$\ddot{\theta} + a\dot{\theta} + b\theta + c\int \theta dt + 0.$$

Up to this point, Figs. 1 and 6 are identical and the above description and reference numbers refer to both figures. The difference comes in the application of the movement of the pinion 27 to the ship's steering gear.

In Fig. 1 28 is a hand steering wheel of usual type which is rigidly attached to a shaft 29 which passes through the front of the box 1 and carries at its other end the bevel pinion 30. 31 is the ship's telemotor shaft or a shaft controlling the valves of a steam or hydraulic steering gear or the switches of an electrical steering gear, or operating a small tiller from which the ship's steering gear is controlled by means of a suitable relay. The shaft 31 has a square end 32 on which is slidably mounted a sleeve carrying two bevel pinions 33 and 34 of which 33 can be made to mesh with pinion 27, or 34 with 30, the gear ratios 27—33 and 30—34 being identical. The position of the pinions 33 and 34 is regulated by a fork 35 engaging with a collar 36 on the sleeve, the fork 35 being carried by a bar 37 which slides in guides on the floor of the box 1. The bar 37 fork 35 and pinions 33 and 34 can be moved axially, by a pivoted lever 38 which has a fork at one end fitting over a stud on the bar 37. The fulcrum of the lever 38 consists of a fork 39 pivoted in a vertical bearing in the floor of the box. The other end of the lever 38 passes through a slot in the front of the box 1 and is furnished with a handle 40. Detents are cut on the upper edge of the slot through which the lever 38 passes so that when either pinion 33 or 34 is meshed with its opposite member the lever 38 is held fast in one or other of the detents in a manner well known in the art. The bar 37 carries one portion 41 of a knife-edge switch, the other portion 42 being attached to the side of the box 1 so that when the pinions 27—33 are meshed the switch is closed and when 30—34 are meshed the switch is open. To either side of this switch is connected the wiring of the D. C. supply to the transmitters actuating the motors 2, 7 and 15 and to the D. C. motor 19 so that when the gears 30—34 are in mesh, that is when the ship is being steered by hand, the automatic gear enclosed in the box 1 is at a standstill.

It must be realized that the automatic mechanism has a definite zero position representing the position of the rudder when the ship is steady on her set course, and if a change is made from manual to automatic steering with the ship, say, on her course but with the helm not in this zero position, then the ship will deviate from her course and can only be restored by the very slow action of the time integral gear. To obviate this I fit a double helm indicator so that before changing control the steersman can insure that the automatic control is in phase with the rudder. I effect this in the following manner:—

On a prolongation of the shaft 26 and on the shaft 29 are fixed two small toothed pinions 43 and 44 respectively gearing with two concentric toothed wheels 45 and 46 journalled in the front of the box 1. The spindles on which the wheels 45 and 46 are mounted pass through each other and also through the front of the box 1, their other extremities carrying pointers 47 and 48 which read against a scale 49 on the outside of the box inside a case 50 the front of which is of glass. An enlarged view of the case 50 is shown in Fig. 5. It is evident that any movement of the shaft 31 will be indicated by the pointer 47 if the ship is under automatic control and by pointer 48 if under hand control, and, the gear ratios being identical, the two pointers will move through the same angle and in the same direction for equal displacements of the shaft 31 by either control. The scale 49 carries a zero mark opposite each pointer representing the zero position of the ship's helm or of the shaft 31 and may be further graduated to show degrees of helm to port and starboard. If, then, the steersman before changing from automatic to hand control, first turns his steering wheel 28 until pointer 48 is in line with pointer 47 and then moves the lever 38 to throw his wheel into gear with the shaft 31, the pointer 48 will then be in phase with the helm and will serve as a helm indicator. Conversely, before changing from hand to automatic steering it will again be necessary to align the pointers in order to place the rudder in phase with the automatic gear.

An alternative method of making automatic and hand control interchangeable is shown in the part of Fig. 6 not already explained.

The shaft 26 (Fig. 6) I arrange to drive one sun pinion of a differential gear 51, the other sun pinion of which is fixed to a short shaft 52 which can be rotated by means of a hand steering wheel 53 or locked by means of a clutch. A bevel wheel 54 bolted to the case of the differential gear 51 is in constant mesh with the pinion 55 on the end of the ship's telemotor shaft 31. It is evident that if the shaft 52 is locked, any motion of the shaft 26 will be communicated through the differential gear 51 and bevel gears 54—55 to the shaft 31 and thence to the ship's steering gear, while if the shaft 52 be rotated by the steering wheel 53 and movement of the shaft 26 is prevented, the movement of the steering wheel will be similarly communicated to the shaft 31 and the ship's steering gear. The method I adopt for preventing movement of the shafts 26 or 52 is better explained by reference to Fig. 7. Shaft 52 passes through a plain bearing in the front of the box 1 and carries outside the box a boss 57 to which the steering wheel is slidably connected by means of a bayonet joint consisting of pins 58, carried by the steering wheel 53, fitting into long and short axial slots 59 cut in the boss 57. A spiral spring 60 compressed by a cap 61 screwed on to the outer end of the shaft 52 keeps the wheel 53 pressed towards the box 1 so that the pins 58 are kept pressed to the inner extremities of either the long or the short axial slots of the bayonet joint, but the steersman, by pulling the wheel 53 towards him and slightly rotating it, can change the pins 58 from the long to the short slots or vice versa. On the inner face of the steering wheel 53 is a circular toothed ring 62 and opposite on the face of the box 1 a similar ring 63. When the pins 58 are in the long slots of the bayonet joint the teeth of the rings 62 and 63 are meshed so that the wheel 53 and shaft 52 cannot be rotated, but if the pins 58 are changed into the short slots, the ring 62 is clear of the ring 63 and the steering wheel 53 and shaft 52 are free to rotate. On the inner side of the steering wheel 53 is a flange 64 which, when the clutch 62—63 is engaged, presses on the end of a plunger 65 housed in the front of the box 1. A spiral spring 66 surrounds the plunger 65 and is compressed between a collar on the plunger and a plug screwed into the box 1 and forming a bearing for the tail end of the plunger 65. The tail of the plunger is attached by a pin to a pivoted lever 67 which carries one portion 68 (Fig. 6) of a knife-edge switch, the other portion 69 being attached to the inside of the box 1. This switch is on the wire conveying the D. C. supply to the transmitters actuating the motors, 2, 7 and 15 and also the D. C. supply to the motor 19. When the ship is being steered by hand, therefore, the switch is opened by the spring 66 and the automatic gear enclosed in the box 1 is inactive.

For the same reasons as are mentioned above, I fit a double helm indicator (not shown) with this arrangement and on the same principle as is illustrated in Fig. 5 with this difference, that I actuate the hand steering pointer 48 from the shaft 31 and the pointer 47 from the shaft 26, the reason being that in this arrangement of control it is impossible to align the pointers by movement of the steering wheel 53 before changing to manual steering as the steering wheel 53 is then immobile. As here described the pointer 48 is always active and in phase with the rudder and it is only necessary to align the pointers when changing from manual to automatic steering in order to place the rudder in phase with the automatic gear.

Fig. 2 shows a method of deriving the displacement and time integral controls from a gyro-compass: 70 is a diagrammatic sketch of a gyro-compass which forms no part of the present invention, and may be of any type capable of communicating to a distance an indication of its apparent movement in azimuth. 71 is a compass follower of usual type actuated by a small follow-up motor 72 by means of a toothed pinion 73 meshing with the gear ring 74 attached to the follower 71. 75 is a transmitter actuated by the pinion 76 meshing with the teeth of the ring 74.

77 is a small box containing a step-by-step motor 78 which may be the motor of a repeater compass, electrically connected to the transmitter 75. To the shaft of the motor 78 is attached the pinion 79 of a differential gear 80 the opposite pinion 81 being connected by a short shaft to the drum 82 of a transmitter, the brushes 83 of which are carried on a sleeve 84 which is bolted to the case of the differential gear 80. On the outside of the sleeve 84 and wired to the brushes 83 are four insulated slip rings 85 in constant contact with a second set of brushes 86 carried on a bridge 87 mounted in the box 77 and electrically connected to the motors 2 and 15. (Figs. 1 and 6). Bolted also to the differential case 80 is a toothed ring 88 with which meshes a small toothed pinion 89 rigidly attached to a shaft 90 which carries, outside the end of the box 77, a small hand wheel 91 by means of a clutch (not shown but similar to that illustrated in Fig. 7) by which rotation of the shaft 90 can be permitted or prevented at will. The other end of the shaft 90 carries a worm 92 meshing with a worm wheel 93 to the spindle of which is also attached a compass card 94 the graduations of which can be read through a window in the lid of the box (not shown) against a pointer 95 attached to the box. The card 94 is attached to its spindle by a knurled nut 96 so that by releasing the nut the card can be rotated by hand, to synchronize the card with the compass.

It is evident that, given no motion of the shaft 90 rotation of the armature of the motor 78 which is proportional to the apparent movement in azimuth of the compass 70 will be communicated to the transmitted drum 82 and thence via the brushes 83, rings 85, brushes 86 to motors 2 and 15 of Figs. 1 and 6. That is to say these two motors will receive a displacement proportional to any apparent movement of the compass, i. e. proportional to any actual angular movement of the ship. Similarly, given no motion of the armature of the motor 78 rotation by hand of the shaft 90 will communicate to the brushes 83 through the gear 88—89 a displacement proportional to the rotation of the shaft 90 and to the transmitter drum 82 through the action of the differential gear 80, a displacement in the same direction of double that amount, or a net displacement of drum to brushes of an amount proportional to the displacement of the shaft 90. The gear ratios 92—93 and 88—89 are so arranged that a rotation of the shaft 90 so as to turn the card 94 through an angle $\phi$ can be made to produce a displacement of the drum 82 with respect to the brushes 83 of the same amount, but of opposite sign, as would be produced through the motor 78 by angular movement of the ship through the angle $\phi$. If therefore the card 94 is set by hand at the commencement of a voyage to show the actual heading of the ship against the pointer 95 any subsequent desired change of course can be made by rotating the hand wheel 91 until the graduation on the card 94 corresponding to the desired new course is brought against the pointer 95 as the displacement of the transmitter drum 82 will at once cause movement of the motor 2 of an amount proportional to the movement of the card 94 i. e. proportional to the desired change of course, which will be communicated to the rudder, and the ship's response to the helm will create movement of the compass transmitter 75, the motor 78 and transmitter drum 82 and both the drum 82 and the ship's rudder will be restored gradually to their zero positions pari passu with the ship's approach to its new course.

Once the course is set, and the shaft 90 locked by the clutch in the handwheel 91, rotation of the brushes 83 is impossible, but every movement of the ship from the set course will give rise to a proportionate displacement of the core 82, which will create in turn a proportionate displacement of the ship's rudder in the direction requisite to effect a correction of the ship's deviation.

Figs. 3 and 4 illustrate a constrained gyroscope to indicate the ship's angular velocity, with means to convey a displacement to motor 7 (Figs. 1 and 6) proportional thereto. 100 is a gyroscope with its axis horizontal and preferably fore-and-aft mounted athwartships on trunnions 101 in bearings in two pillars of a frame 102 to one of which is rigidly attached to cantilever spring 103 engaging with the forked end of an arm 104 projecting from the gyro casing. One trunnion 101 of the gyro case is continued through its support and carries at its extremity a crank 105 at the lower end of which is a circular 2-piece commutator ring 106 of which the insulated divisions between the two semi-circular pieces is vertically at top and bottom of the centre line. Pivoted in the centre of the ring 106 and in a stirrup 107 bolted to the crank 105 is a spindle 108 which has an arm at right angles to its axis on which is pivoted a contact roller 109 in contact with the commutator ring 106. Outside the stirrup 107 the spindle 108 carries a small toothed pinion 110. The frame 102 has a third pillar, in bearings in which and in the end of the gyro trunnion 101 is a shaft 111 to which are keyed a worm wheel 112 and an arm 113 on which a toothed sector 114 meshes with the pinion 110. Carried in brackets on the third pillar of the frame 102 (see Fig. 4) are a reversible follow-up motor 115 connected by wiring (not shown) to the contact roller 109 and both segments of the commutator 106, driving a worm 116 meshing with the worm wheel 112 and a transmitter 117.

So long as the ship has no angular velocity the gyro 100 will be kept vertical by the spring 103, but when forced to turn in azimuth by any deviation of the ship the gyro casing will tilt on its trunnion axis 101 against the spring until the spring force is sufficient to produce the horizontal precession required. This angle of tilt, if kept within small limits by a strong spring control, is proportional to the ship's angular velocity, and to obviate the difficulty of measuring very small angles I obtain a magnified indication of the tilt.

As illustrated, the gyro in tilting rotates the crank 105 which causes the pinion 110 to roll on the toothed sector 114 of the arm 113 which remains stationary. The rotation of the pinion 110 causes the roller 109 to roll round the commutator ring 106 through an angle which is a multiple of the angle of tilt of the gyro. In so doing the roller 109 establishes contact with one or other segment of the commutator 106 causing the motor 115 to rotate the worm 116 and through it the wheel 112, shaft 111 and the arm 113, the toothed sector 114 of which causes the pinion 110 and contact roller 109 to rotate in the reverse direction until the roller 109 breaks contact by reaching the zero position between the commutator segments, when movement of the motor 115 will cease. In this position the angular movement of the wheel 112 and arm 113 is equal to the angular movement of the crank 105 which is equal to the tilt of the gyro 100. The displacement of the armature of the motor 115 in bringing this about and the simultaneous displacement of the drum of the transmitter 117 are therefore proportional to the angle of tilt of the gyro, which, as has been explained is proportional to the ship's angular velocity. It is therefore evident that whenever the ship has angular movement the motor 7 (Figs. 1 and 6) to which the transmitter 117 is wired, will receive a displacement and will communicate to the ship's steering gear a displacement proportional to the ship's angular velocity. On angular movement of the ship ceasing the gyro will at once be restored to the vertical by the spring 103 when the above procedure will be reversed and the motor 7 (Figs. 1 and 6) will take off the amount of helm that its former motion had imposed on the ship.

I may simplify the design by the arrangement shown in Fig. 8 wherein 100 is a constrained gyro similar to that shown in Figs. 3 and 4, but the spring 103 is carried not by the frame 102 but by a sleeve 121 rotatable on a boss 122 projecting from one of the pillars of the frame and coaxial with the gyro trunnion 101. The sleeve 121 carries on its outer face a bevel pinion 123 which meshes with another bevel pinion 124 on the upper end of a vertical shaft 125 supported in a bracket 126 bolted to the pillar and in an end bearing 127 in the base plate. 128 is a step-by-step motor connected by wiring (not shown) to the transmitter brushes 86 (Fig. 2) and performing the same functions as the motor 2 in Figs. 1 and 6. The displacement of the motor 128 is communicated by a worm 129 to a worm wheel 130 keyed to the shaft 125. To the gyro case I attach a contact roller 131 bearing against the face of a two piece commutator 132 carried on a bent arm 133 carried by a sleeve 134 pivoted on a boss 135 on the other supporting pillar of the gyro and coaxial with the gyro trunnions 101. The sleeve 134 also carries a worm sector 136 gearing with a worm 116 actuated by a reversible follow-up motor 115 by means of a shaft which also carries the drum of a transmitter 117, in exactly the same way as is shown in Fig. 4.

The description already given will make it clear that the shaft 125, pinion 124, pinion 123, sleeve 121 and spring 103 will all receive rotations from the motor 128 proportional as the case may be to any desired change of prescribed course, or to any deviation of the ship from the set course. The position of the spring 103 regulates the zero position of the gyro 100 which has no freedom in the horizontal plane and will therefore yield to any external couple applied in the vertical plane. Every time the ship swings, therefore, the gyro will be tilted by the motor 128 and the spring 103 through an angle proportional to the ship's angular displacement and will receive a further tilt against the spring 103 on one side or other of that zero position proportional to the ship's angular velocity at the moment. Any tilt of the gyro 100 will displace the contact roller 131 which will make contact with one or other segment of the commutator 132 and therefore produce rotation of the armature of motor 115, worm 116, sector 136, arm 133 and commutator 132 until the electrical supply to the motor 115 is broken by the insulating division of the commutator coming opposite the roller 131. At this point the drum of the transmitter 117 will have received a displacement proportional to the tilt of the arm 133 which is obviously the same as the tilt of the gyro 100 which we have seen contains two components proportional respectively to the ship's deviation and the angular velocity. In Figs. 1 and 6, therefore I eliminate motors 2 and 7 and the differential gear 8 and substitute therefor a single reversible follow-up motor wired to the transmitter 117 (Fig. 8) and coupled to the shaft 12. Fig. 9 is an alternative design embodying further simplifications. The construction is to a certain point identical with that of Fig. 8 and to that extent is similarly numbered for reference. The shaft 125 is driven by bevel wheels 140 and 141 of which 140 is keyed to the shaft 125 and 141 is bolted to the case 142 of a differential gear the sun pinions 143 and 143ª of which are driven, 143 through a worm 144 and worm wheel 145 by the motor 78 (already described in connection with Fig. 2 and actuated by the compass transmitter 75 Fig. 2) and 143ª by a hand wheel 146, worm 147, and worm wheel 148. On the shaft which carries the hand wheel 146 and worm 147 is a second worm (not shown) actuating a course-setting card similar in design and function to the card 94 Fig. 2.

The displacement of the pinion 140 and of the shaft 125 is therefore proportional to any desired change in the prescribed course or to the ship's deviation from her set course. This displacement is communicated to the gyro, as before, to alter the position of zero velocity and is also communicated by a shaft 149 carried by the spider of the differential gear to a worm 150 which I may use, as in Figs. 1 and 6, to displace the actuating spindle of a variable speed gear or to operate a clock-work or other type of integrator. In Figs. 9 and 10 I show a clock work integrator. The worm 150 meshes with a worm sector 151 carried by a lever 152 pivoted on a pin 153 and connected at its other end by a short connecting rod 154 to a bar 155 which has axial movement only in supports 156 fixed to the base-plate of the frame 102. Between the supports 156 the bar 155 has a rectangular or U-shaped frame 157 which serves to support a friction wheel 158 whose axis is parallel with the bar 155 and which is held in constant frictional contact with a disc 159 rotated at a constant slow speed by clockwork contained in a box 160 embedded in the frame 102. The spindle of the wheel 158 is connected by a flexible shaft 161 to worm 162 meshing with the sector 136. The mechanism is so adjusted that when the shaft 149 is at its zero position, that is when the ship is on her course, the wheel 158 is on the centre of the friction disc 159 and therefore has no motion. Any deviation of the ship, however, will give rise to motion of the shaft 149, lever 152 and bar 155 which will displace the wheel 158 to one side or other of the centre of the disc 159 when the wheel 158 will commence to rotate through friction with the disc. The velocity of rotation of the wheel 158 will vary with its distance from the centre of the disc 159, which is obviously proportional to the magnitude of the ship's deviation from her set course. The total displacement of the wheel 158 over a long-continued deviation will therefore be the integration of the deviation with respect to the time interval. The worm 162 is supported on two brackets 163 carried by a worm wheel 164 mounted on a boss 165 on a pillar of the frame 102 coaxially with the trunnion axis 101. As before the pillar also carries a reversible follow-up motor 115 driving a worm 116 and the drum of a transmitter 117, the worm 116 meshing with the wheel 164 and the motor being wired to the contacts 131 and 132. The brushes of the transmitter 117 are connected by wiring (not shown) to a follow-up motor coupled direct to the shaft 26 (Figs. 1 and 6) in substitution for all the gear of these figures up to and including reference No. 25.

The action of the integrator in rotating the worm 162 is to rotate the arm 133 thus displacing the commutator 132 with respect to the roller 131 thereby causing the motor 115 to rotate the wheel 164, brackets 163, worm 162 and arm 133 until the roller 131 is restored to its zero position between the commutator segments 132. The result is a permanent displacement of the armature of the motor 115 and drum of the transmitter 117 entailing a permanent and proportional displacement of the motor driving shaft 26 (Figs. 1 and 6) and therefore of the ship's steering gear by an amount proportional to the time integral of the deviation. This action is quite independent of that of the gyro 100 and the shaft 125, which can go on simultaneously and undisturbed, as any movement on their part can only displace the contact roller 131 whereas the integrator displaces the commutator 132. The motor 115 has therefore to keep the roller 131 in phase with the commutator 132 while the former has displacements proportional to both the deviation and the angular velocity and the later moves proportionally to the time integral of the deviation. The resultant displacement of the motor 115 and transmitter 117 is therefore proportional to the sum of all three components and, the brushes of the transmitter 117 being wired to a single motor driving the shaft 26 (Figs. 1 and 6) the total displacement is conveyed in combined form direct to the ship's steering gear.

Fig. 11 illustrates a mechanism which I may employ to give a single combined control without using a constrained gyro.

166 is a box in elevation with the front removed. 167 is a step-by-step motor connected by wiring (not shown) to the transmitter brushes 86 of Fig. 2 and therefore receiving a displacement proportional to any desired change of course or to the ship's deviation from the course so set. The motor 167 by means of a worm 168 and worm wheel 169 rotates the case 170 of a differential gear, in which the spider 171 which carries the planet pinions is attached to a vertical shaft 172 projecting through the upper sun pinion 173. The pinion 173 is bolted to the case 174 of a viscous brake above the differential gear, the brake plate 175 being rigidly attached to a two-armed spider 176 loosely pivoted on the shaft 172 one arm carrying a small vertical fork 177 and the other arm a small coaxial contact roller 178. The brake plate does not come in contact at any point with the brake case, the small clearance space between them being filled with a viscous fluid. Alternatively, I may use an eddy current brake but for simplicity only a viscous brake is illustrated. To the upper extremity of the shaft 172 is rigidly attached a collar 179 carrying a cantilever spring 180 the outer end of which is held in the fork 177. Pivoted on an extension of the shaft 172 is an arm 181 which supports at one end a two-piece commutator 182 in contact with the roller 178 and at the other end terminates in a worm sector 183 meshing with a worm 184 supported from the roof of the box in brackets 185. The bottom pinion 186 of the differential gear is rigidly attached to a worm wheel 187 with which is meshed a worm 116 driven by a reversible follow-up motor 115 connected by wiring (not shown) to the contacts 178 and 182. To the shaft of the motor 115 is also attached the drum of a transmitter 117, as before. The wheel 187 and differential gear are pivoted on a vertical shaft 188 attached to the floor of the box 166.

When the ship deviates from her course the motor 167 will receive a displacement proportional to the deviation, rotating the case 170, spider 171 and shaft 172 by an amount which will also be proportional to the deviation. By the action of the differential gear (the lower pinion 186 of which can for the moment be taken as fixed) the movement of the spider 171 will create movement of the pinion 173 in the same direction as the spider 171 but of double the amount. The pinion 173 and the brake case 174 attached to it will therefore be turned through an angle equal to twice the angle through the shaft 172 turns. The brake case 174 will tend to drag round with it the brake plate 175 by the viscous friction of the surrounding fluid but the plate will be retarded by its connection through the fork 177 with the spring 180 which is rigidly attached to the more slowly moving shaft 172. The brake plate will therefore occupy an intermediate position between the two moving elements, having an advance with respect to the more slowly moving shaft 172 varying with the viscosity of the fluid in the brake casing and the strength of the spring 180 but in all cases proportional to the angular velocity of the pinion 173 with respect to the shaft 172 which is proportional to the angular velocity of the ship. At every moment of the ship's angular movement, therefore, the brake plate 175 and its attached arms 176 and contact roller 178 will have a displacement with respect to the ship proportional to the deviation of the ship from her set course plus an amount proportional to the ship's angular velocity.

I may employ any of the methods already described to integrate the deviation with respect to time in order to obtain the weather helm component and in Fig. 11 no particular integrator is shown. Whatever be the type employed, I actuate its moving member by means of a second worm driven by the motor 167 and convey the final integrated displacement by a flexible shaft to the worm 184, the result being to displace the commutator 182 in one direction or the other by an amount proportional to the time integral of the deviation. The two segments of the commutator 182 and the contact roller 178 being wired to the follow-up motor 115 the displacement of that motor and of the drum of transmitter 117 will therefore be proportional to the total resultant displacement of the roller 178 and commutator 182 that is to say, it will be a displacement having three components proportional to the ship's deviation, the ship's angular velocity, and the time integral of the deviation.

This single combined displacement I communicate to the ship's steering gear in the same way as is described in explanation of Fig. 9.

It has already been stated that the equation of motion to be aimed at is $$\ddot{\theta} + a\dot{\theta} + b\theta + c\int\theta dt = 0$$

which by differentiation becomes $$\dddot{\theta} + a\ddot{\theta} + b\dot{\theta} + c\theta = 0$$

Writing $\theta = A e^{pt}$ in conventional manner the equation $\phi + a_p^2 + b_p + c = 0$ is obtained, a cubic equation in $p$ having either (1) one real and two imaginary roots or (2) three real roots. I may choose values of $a$ $b$ and $c$ to satisfy (1) in which case the deviation is made up of a damped oscillation representing the two imaginary roots and an additional deviation superimposed on the oscillation and decreasing exponentially, so that the combination represents an oscillation about a moving centre which is approaching the true zero exponentially. Alternatively, I may choose the values of $a$ $b$ and $c$ to satisfy (2) in which case the deviation is the sum of three components each of which is decreasing exponentially.

I prefer to choose $a$ and $b$ so that when there is no need for weather helm and the integrator might be cut out of action, the helm would be displaced by the $a$ and $b$ components alone, so that the ship would move about its prescribed course in a damped oscillation which would be almost dead-beat in character. I choose $c$ so that when no weather helm is required and the integrator is working, the displacement of the helm produced by the integration of the above oscillations is negligible. Subject to this condition I make $c$ as great as possible. The motion of the ship would then satisfy (1). The constants $a$, $b$ and $c$ are all determinable by the gear ratios and other constants of the particular mechanism described above, together with the effective motion produced on the ship by a given displacement of helm. Being given a curve of the oscillations of the ship about a given course produced, say, by a known regular oscillatory motion of the helm the velocity ratios and other constants of the mechanism could all be calculated.

I claim:—

1. In apparatus for controlling the steering control mechanism of a dirigible craft, a member responsive to deviation of the craft from a prescribed heading and means connecting the member to the steering control mechanism for displacing the mechanism in the direction required to correct the deviation until it is annulled and for thereafter maintaining the displacement of the mechanism constant.

2. In apparatus for controlling the steering control mechanism of a dirigible craft, an integrator comprising a member controlled by the heading of the craft, a second member actuated by external power proportionally to time and co-operating with the first member and a third member actuated jointly by the first and second members proportionally to the time-integral of deviation of the craft from a prescribed heading and means for connecting the third member to the steering control mechanism for displacing the same proportionally to the time-integral of deviation.

3. In apparatus for controlling the steering control mechanism of a dirigible craft, means responsive to deviation of the craft from a prescribed heading, means responsive to the angular velocity of deviation, a member actuated as to direction by both of said responsive means and as to amount by time and means connecting the member to the steering control mechanism to displace the same in a direction to correct deviation.

4. In apparatus for controlling the steering control mechanism of a dirigible craft, means responsive to deviation of the craft from a prescribed heading, a member actuated as to direction by the responsive means and as to amount by time and means connecting the member to the steering control mechanism to displace the same in a direction to correct the deviation.

5. In apparatus for controlling the steering control mechanism of a dirigible craft, means responsive to deviation of the craft from a prescribed course, an integrator comprising a member actuated by external power proportionally to time, a second member controlled by the responsive means and a third member actuated jointly by the first and second members proportionally to the time-integral of the deviation of the craft and means connecting the third member to the steering control mechanism to actuate the same in proportion to the time-integral.

6. In apparatus for steering a dirigible craft provided with a steering control mechanism adapted to be displaced to either side of a normal zero position, means responsive to deviation of the craft from a prescribed course and means responsive to the first means and adapted to displace the zero position during deviation and to maintain the displacement of the zero position after correction of the deviation.

7. In apparatus for steering a dirigible craft provided with a steering control mechanism adapted to be displaced to either side of a normal zero position, means responsive to time and to deviation of the craft from a prescribed course and means connecting the responsive means to the steering control mechanism to displace the zero position during deviation of the craft by an amount proportional to the time-integral of the deviation.

8. In apparatus for steering a dirigible craft provided with a steering control mechanism adapted to be displaced to either side of a normal zero position, means responsive to deviation of the craft from a prescribed heading, means responsive to the rate of deviation, a member actuated by the first responsive means and means connecting the member to the steering control mechanism to displace the zero position of the same in a direction to correct the deviation.

9. In apparatus for controlling the steering control mechanism of a dirigible craft, means responsive to deviation of the craft from a prescribed heading, means responsive to the rate of deviation, an integrator actuated jointly by external power proportionally to time and by the first named responsive means and means for connecting the integrator to the steering control mechanism to displace the same in proportion to the time-integral of the deviation of the craft.

10. In apparatus for controlling the steering control mechanism of a dirigible craft, a gyroscope for indicating a predetermined direction, a follow-up mechanism for the gyroscope adapted to be actuated in accordance with the departure of the heading of the craft from the predetermined direction, a member actuated by external power at constant speed, a second member operatively associated with the first member and actuated relatively thereto by the follow-up system proportionally to deviation of the craft from the predetermined direction, a third member operated jointly by the first and second members proportionally to the time-integral of the deviation of the craft and means connecting the third member to the steering control mechanism to actuate the same proportionally to the time-integral of deviation.

11. In apparatus for controlling the steering control mechanism of a dirigible craft, a member responsive to deviation of the craft from a predetermined direction, a member responsive to the rate of deviation of the craft, a third member responsive to deviation and movable in proportion to the time-integral thereof, differential means for combining the action of the three members and a connection between the differential means and the steering control mechanism for actuating the same to correct the deviation.

12. In apparatus for steering a dirigible craft provided with a steering control mechanism adapted to be displaced to either side of a normal zero position, means to vary the zero position according to deviation of the craft from a prescribed course including an integrator having a member actuated proportionally to the deviation.

13. In apparatus for controlling the steering of a dirigible craft provided with a directional controller, means for controlling the directional controller in accordance with the amount of deviation of the craft from a prescribed course, means for controlling the directional controller in accordance with the rate of deviation of the craft and means for controlling the directional controller in accordance with the time-integral of deviation of the craft.

14. In apparatus for controlling the steering of a dirigible craft provided with a directional controller, means for controlling the directional controller in accordance with the amount of deviation of the craft from a prescribed course, means for controlling the directional controller in accordance with the rate of deviation of the craft, means for controlling the directional controller in accordance with the time integral of deviation of the craft, and means for altering the prescribed course of the craft.

15. In apparatus for controlling the steering of a dirigible craft provided with a directional controller, means for automatically controlling the directional controller in accordance with the amount of deviation of the craft from a prescribed course, means for automatically controlling the directional controller in accordance with the rate of deviation of the craft, means for automatically controlling the directional controller in accordance with the time-integral of deviation of the craft, manually operable means for controlling the steering of the craft independently of said automatic means and means for rendering the manually operable means interchangeable with the automatic means in controlling the steering of the craft.

16. The method of compensating for the deviations of a craft from a prescribed course caused by steady or slowly varying external forces which consists in imparting to the directional controller of the craft a displacement proportionally to the time-integral of the deviation of the craft from the prescribed course due to the forces.

17. The method of compensating for the deviations of a craft from a prescribed course caused by steady or slowly varying external forces which consists in imparting to the directional controller of the craft a displacement jointly proportionally to the amount of deviation of the craft from the prescribed course, due to the forces, the angular velocity of the deviation of the craft and the time-integral of the deviation of the craft.

18. The method of compensating for the deviations of a craft from a prescribed course caused by steady or slowly varying external forces which consists in imposing on the craft a couple in opposite phase to, and varying with, the deviation of the craft from the prescribed course, a couple in opposite phase to, and varying with, the angular velocity of deviation of the craft and a couple in opposite phase to, and varying with, the time-integral of the deviation of the craft.

19. In apparatus for controlling the steering of a dirigible craft having a directional controller, an integrating mechanism controlled automatically by deviation of the craft from a prescribed course and means for displacing the directional controller until the deviation is corrected and for thereafter maintaining the displacement previously given to the controller.

20. In apparatus for controlling the steering of a dirigible craft having a directional controller, means actuated in accordance with the time-integral of deviation of the craft from a prescribed course, a member adapted to be automatically displaced by the means proportionally to the time-integral of deviation and means for communicating the displacement of the member to the directional controller of the craft.

JAMES BLACKLOCK HENDERSON.

Certificate of Correction.

Patent No. 1,612,434.            Granted December 28, 1926, to

JAMES BLACKLOCK HENDERSON.

It is hereby certified that error appears in the printed specification of the above-numbered patent requiring correction as follows: Page 3, line 45, in the formula strike out the last or fourth plus sign (+) and insert instead an equality sign (=); page 8, line 95, strike out the equation and insert $p^3+ap^2+bp+c=0;$ and that the said Letters Patent should be read with these corrections therein that the same may conform to the record of the case in the Patent Office.

Signed and sealed this 14th day of August, A. D. 1928.

[SEAL.]                                            M. J. MOORE,
*Acting Commissioner of Patents.*